(12) United States Patent
Kobayashi

(10) Patent No.: US 11,503,179 B2
(45) Date of Patent: Nov. 15, 2022

(54) APPARATUS, METHOD, AND STORAGE MEDIUM FOR PROCESSING OF AN IMAGE CAPTURED BY A CAMERA

(71) Applicant: CANON KABUSHIKI KAISHA, Tokyo (JP)

(72) Inventor: Hiroaki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/901,526

(22) Filed: Jun. 15, 2020

(65) Prior Publication Data
US 2020/0404119 A1 Dec. 24, 2020

(30) Foreign Application Priority Data
Jun. 18, 2019 (JP) .............................. JP2019-113206

(51) Int. Cl.
*H04N 1/23* (2006.01)
*H04N 1/00* (2006.01)

(52) U.S. Cl.
CPC ......... *H04N 1/2323* (2013.01); *H04N 1/0071* (2013.01); *H04N 1/00474* (2013.01); *H04N 1/00681* (2013.01); *H04N 1/00708* (2013.01); *H04N 1/00713* (2013.01); *H04N 1/00718* (2013.01); *H04N 1/2338* (2013.01)

(58) Field of Classification Search
None
See application file for complete search history.

(56) References Cited

U.S. PATENT DOCUMENTS

| | | | |
|---|---|---|---|
| 10,635,898 B1* | 4/2020 | Pribble | G06K 9/228 |
| 2008/0240565 A1* | 10/2008 | Kitazaki | G06V 10/235 |
| | | | 382/175 |
| 2011/0285874 A1* | 11/2011 | Showering | G06K 9/228 |
| | | | 348/231.99 |
| 2015/0143237 A1* | 5/2015 | Shindo | H04N 1/3875 |
| | | | 715/273 |
| 2015/0256696 A1* | 9/2015 | Wada | H04N 1/00005 |
| | | | 358/448 |
| 2016/0217340 A1* | 7/2016 | Miyauchi | G06K 9/3283 |
| 2017/0132866 A1* | 5/2017 | Kuklinski | G07D 7/2083 |
| 2019/0005627 A1* | 1/2019 | Nanaumi | G06T 7/75 |
| 2020/0021704 A1* | 1/2020 | Yasui | H04N 1/00761 |

FOREIGN PATENT DOCUMENTS

JP 2003-058877 A 2/2003

\* cited by examiner

*Primary Examiner* — Miya J Williams
(74) *Attorney, Agent, or Firm* — Canon U.S.A., Inc. I.P. Division

(57) ABSTRACT

An information processing apparatus includes a memory storing instructions and a processor to execute the instructions to perform operations. Four sides of a document included in captured image data are detected. Lengths of the detected four sides of the document are calculated. The operations further include determining which of a plurality of predefined paper sizes corresponds to the document based on the calculated lengths of the four sides. The determined corresponding paper size is set as a document size of the document.

11 Claims, 13 Drawing Sheets

FIG. 5

| KIND OF PAPER SIZE | WIDTH | HEIGHT |
|---|---|---|
| POSTCARD | 100 | 148 |
| ENVELOPE | 120 | 235 |
| A4 | 210 | 297 |
| A3 | 297 | 420 |
| B6 | 128 | 182 |
| B5 | 182 | 257 |

APPARATUS, METHOD, AND STORAGE MEDIUM FOR PROCESSING OF AN IMAGE CAPTURED BY A CAMERA

BACKGROUND

Field

The present disclosure relates to an information processing apparatus configured to set the size of a document photographed with a camera.

Description of the Related Art

Japanese Patent Laid-Open No. 2003-058877 discloses a method for detecting the area of a document in an image captured by a camera, deforming the detected document area into a rectangle, comparing the aspect ratio of the rectangle with aspect ratios listed in a correction type table, and correcting the rectangular image to have the closest aspect ratio in the correction type table.

Documents with the same width-to-height ratio may have different paper sizes. For example, although A4 size and A3 size have the same aspect ratio of $1:\sqrt{2}$, A4 has a width of 210 mm and a height of 297 millimeter (mm), and A3 has a width of 297 mm and a height 420 mm. In this case, only with the ratio of the width to the height of the document, an image of an A3 document may be determined to have A4 size, and thus the document size cannot be narrowed to one.

SUMMARY

According to an aspect of the present disclosure, an information processing apparatus includes a memory to store instructions, and a processor to execute the instructions to perform operations including: detecting four sides of a document included in captured image data, calculating lengths of the detected four sides of the document, determining which of a plurality of predefined paper sizes corresponds to the document based on the calculated lengths of the four sides, and setting the determined corresponding paper size as a document size of the document.

Further features of the present disclosure will become apparent from the following description of exemplary embodiments with reference to the attached drawings.

BRIEF DESCRIPTION OF THE DRAWINGS

FIG. 5 is a diagram illustrating an example of a paper size table.

DESCRIPTION OF THE EMBODIMENTS

First Embodiment

Figure 1:
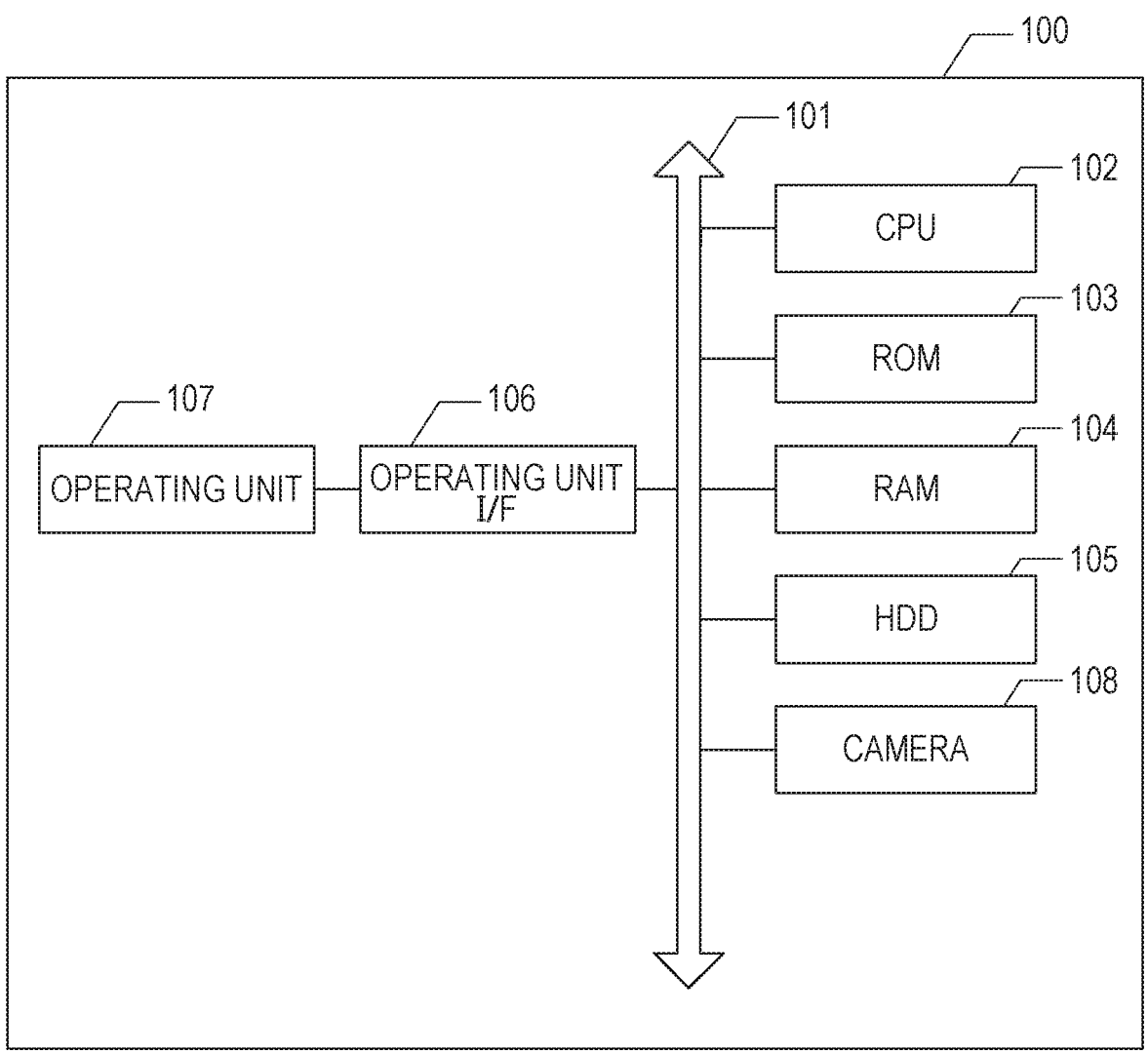
FIG. 1 is a block diagram illustrating the configuration of a mobile terminal.

FIG. 1 is a block diagram illustrating the configuration of a mobile terminal 100, which is an example of an information processing apparatus of a first embodiment. A central processing unit (CPU) 102 reads a control program stored in a read-only memory (ROM) 103 and executes a variety of processes for controlling the operation of the mobile terminal 100. The CPU 102 is connected to the other units via a bus 101. The ROM 103 is a storage device that stores the control program. A random access memory (RAM) 104 is used as a temporary storage area, such as a main memory and a work area for the CPU 102. A hard disk drive (HDD) 105 is a storage device that stores various data, such as images. The HDD 105 is not an absolute necessity if the ROM 103 has a sufficient storage capacity to store data such as images. An operating unit interface (I/F) 106 connects an operating unit 107 and the bus 101 together. The operating unit 107 includes a liquid crystal display having a touch panel function and displays a soft keyboard and various screens. The user can input instructions and information to the mobile terminal 100 via the operating unit 107. A camera 108 captures an image and stores the captured image data in the RAM 104. The user can confirm the image data captured by the camera 108 by displaying the image data stored in the RAM 104 on the screen of the operating unit 107. The mobile terminal 100 includes various sensors (not illustrated), such as an acceleration sensor.

Figure 13:
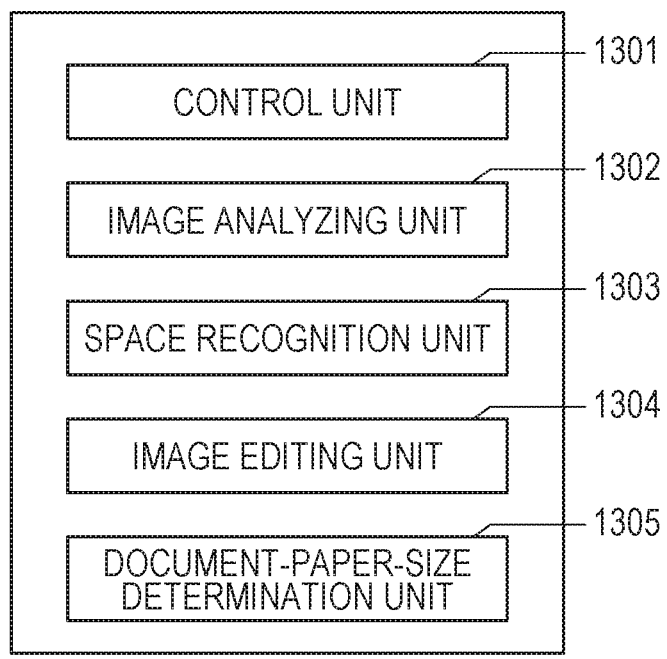
FIG. 13 is a diagram illustrating an example of the functional configuration implemented by a mobile terminal executing a program.

FIG. 13 is a diagram illustrating an example of a functional configuration implemented by the mobile terminal 100. The computer (CPU 102) functions as the processing units illustrated in FIG. 13 by executing the control program stored in the ROM 103. The control unit 1301 controls the entire apparatus, such as determining a user operation input from the operating unit 107 and storing image data captured by the camera 108 in the RAM 104. An image analyzing unit 1302 analyzes the image data stored in the RAM 104 to detect the four sides of a document in the image data. A space recognition unit 1303 recognizes a space and an object (a document) in each of the plurality of images stored in the RAM 104 and calculates the length of the object. The accuracy of measurement of the length of the object can be increased by calculating the length of the object using not only information on the object detected from each image but also information obtained from the various sensors when the image is captured. However, the measurements may include errors. An image editing unit 1304 clips a document portion detected by the image analyzing unit 1302 from the image data and scales the image down or up. A document-paper-size determination unit 1305 determines the detected size of the document on the basis of the information on the width and height of the document calculated by the space recognition unit 1303.

In the first embodiment, the mobile terminal 100 detects the four sides of the document from the image captured by the camera 108, calculates the width and the height of a quadrilateral composed of the detected four sides, and compares the calculation result with a table of standard paper sizes which is stored in the HDD 105 in advance. As a result of the comparison, the closest standard paper size is determined to be the document size. This allows correctly or at least appropriately determining which of the standard paper sizes with the same width-to-height ratio and different sizes correspond to the document.

Figure 2:
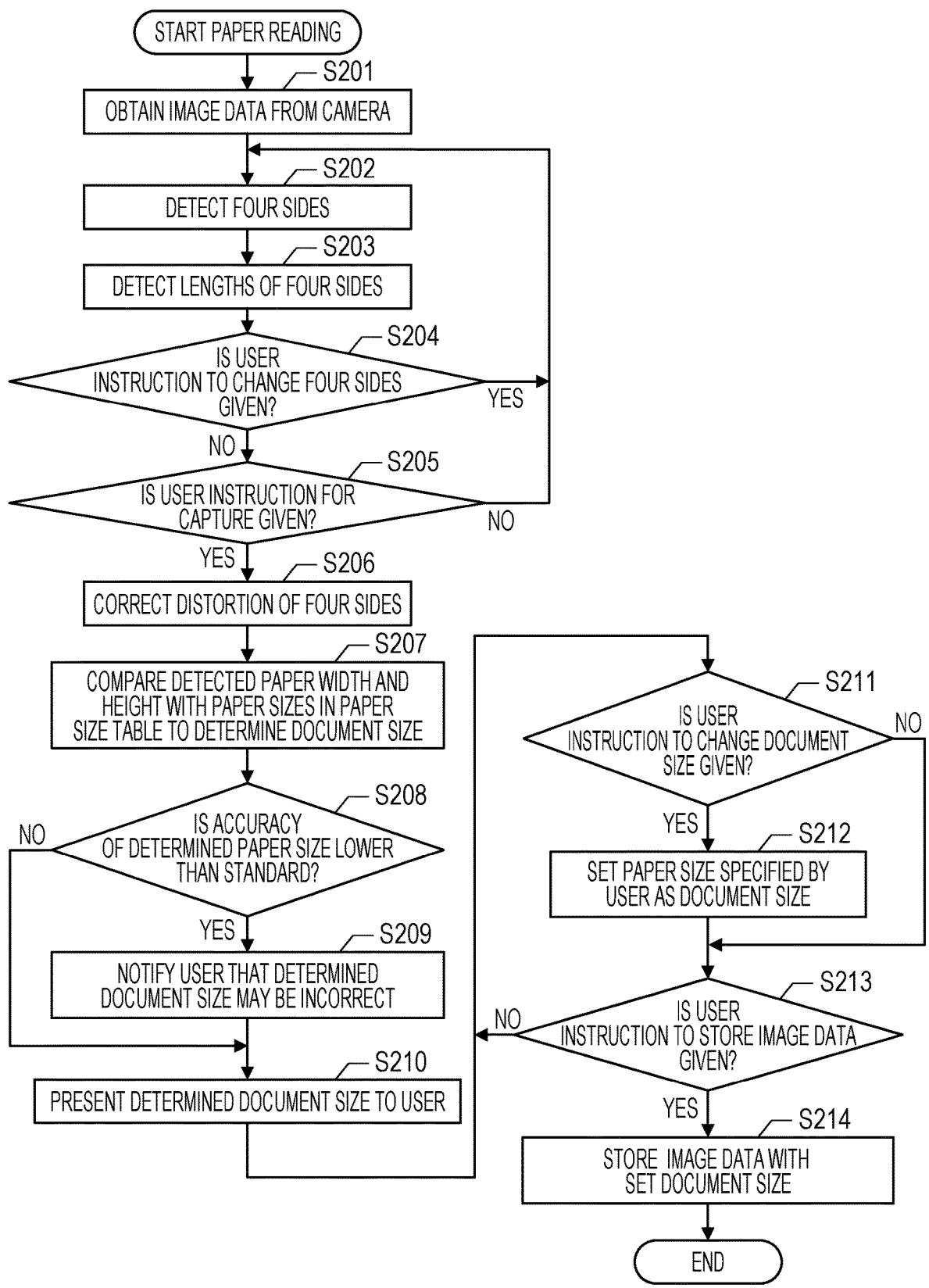
FIG. 2 is a flowchart for document-size determination processing of a first embodiment.

FIG. 2 is a flowchart illustrating the details of processing for capturing an image of a document with the camera 108 of the mobile terminal 100 and determining the size of the captured document image. The processes of the flowchart in FIG. 2 are performed by the CPU 102 executing a control program loaded on the RAM 104.

In step S201, the control unit 1301 starts up the camera 108 and stores captured image data in the RAM 104. The image data captured by the camera 108 can also be presented to the user in real time by sequentially displaying the image data stored in the RAM 104 on the screen of the operating unit 107 via the operating unit I/F 106.

In step S202, the image analyzing unit 1302 analyzes the image data stored in the RAM 104 to detect the edge of the document, thereby detecting the four sides of the document in the image data. The image editing unit 1304 draws the vertices of the detected quadrilateral and the lines connecting the vertices in an emphasis manner over the image data stored in the RAM 104. This allows the user to confirm that the four sides of the document are detected on the image data displayed on the screen of the operating unit 107.

Figure 3A:
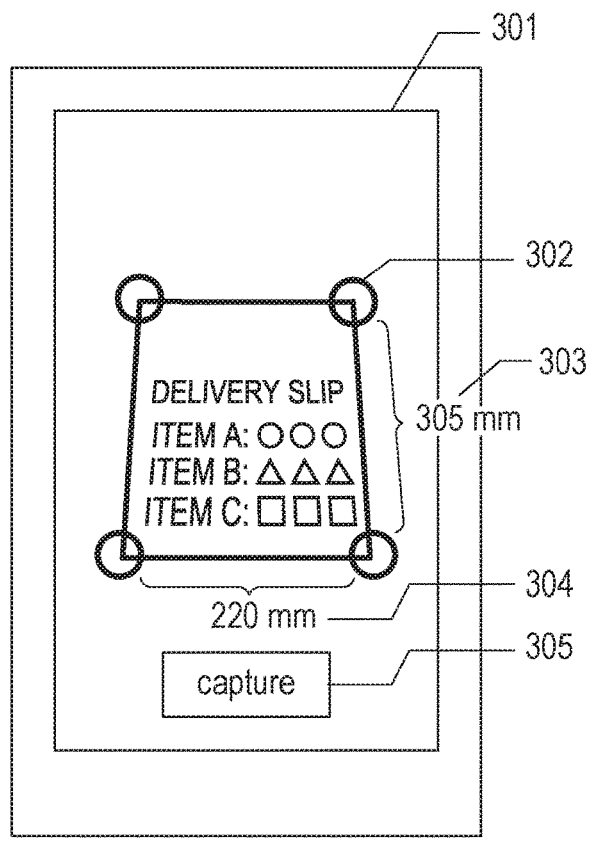
FIGS. 3A and 3B are diagrams illustrating examples of an operation screen in detecting the four sides of a document.

In step S203, the space recognition unit 1303 calculates the lengths of the four sides of the document in the image data detected in step S202. The lengths of the sides are calculated on the basis of the plurality of captured images stored in the RAM 104 and the information from, for example, the acceleration sensor, obtained when the images are captured. For example, the space recognition unit 1303 can obtain the physical lengths (distances) of the object on the basis of the positions of the four sides of the document (the position of the object) detected from each of the plurality of images and information on the difference in capturing position between the images. In other words, the distance can be obtained from the parallax. The length of the object (document) captured by the camera may be calculated using a functional module provided by the operating system (OS) of the mobile terminal 100. The image editing unit 1304 draws numerical values indicating the calculated lengths of the sides, in addition to the lines of the four sides drawn in step S202, on the captured image data. This allows the user to confirm the positions of the detected four sides of the document and the calculated lengths of the four sides on the image data displayed on the screen of the operating unit 107. If the lengths of the opposite sides (the upper side and the lower side, and the left side and the right side) differ to some extent owing to an error in calculation, the mean value of the length of the upper side and the length of the lower side calculated is used as the width of the document, and the mean value of the length of the left side and the length of the right side calculated is used as the height of the document. FIG. 3A illustrates an example of the screen of the operating unit 107 displayed in step S203. Reference sign 301 denotes the screen of the operating unit 107, on which image data stored in the RAM 104 is displayed. Circular marks 302 highlight the positions of the vertices of the quadrilateral detected in step S202, and the center of each circle indicates the position of each vertex. The vertices are connected by a straight line, so that the user can confirm the position of the quadrilateral of the detected document. Reference sign 303 denotes the height of the quadrilateral calculated in step S203. Reference sign 304 denotes the width of the quadrilateral calculated in step S203. Reference sign 305 denotes a button for receiving a capture instruction from the user.

Figure 3B:
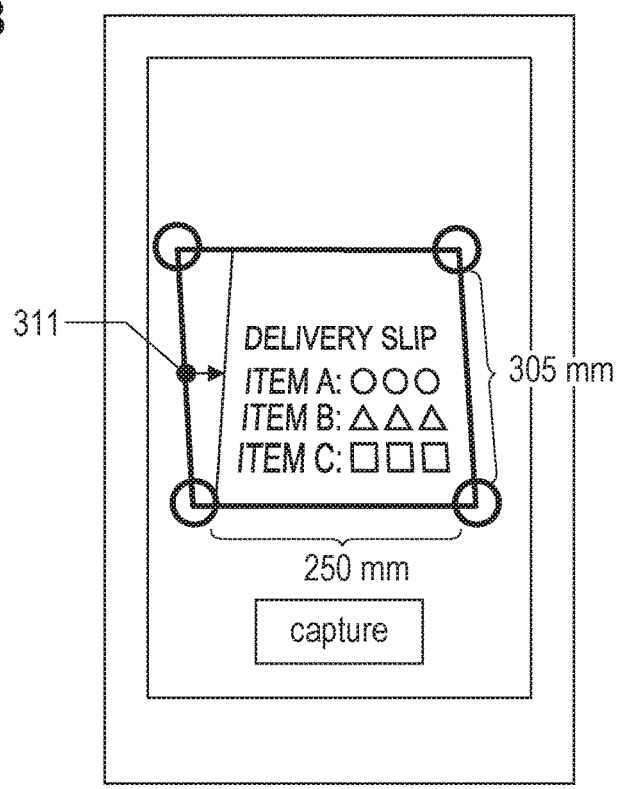

The user can also correct the positions of the four sides of the document detected in step S202 by swiping the circular marks 302 of the vertices or the lines of the four sides connecting the vertices. For example, in the case of a failure in detecting the four sides of the document as in FIG. 3B, swiping a point 311 to the right allows correcting the quadrilateral of the document as in FIG. 3A by detecting the edge in the vicinity of the swiped position as a side of the document. In step S204, the control unit 1301 determines whether an instruction to change the detected vertices or four side has been given from the user. If an instruction for change has been given, the process goes to S202, and quadrilateral detection is performed in the vicinity of the position for which the change instruction is given. If no change instruction has been given, the process goes to S205.

In step S205, the control unit 1301 determines whether a capture instruction button 305 has been pressed by the user. If a capture instruction has been given, the image data and the four sides being displayed are determined as the object to be processed, and the process goes to S206. If no capture instruction has been given, the process goes to S202.

Figure 4A:
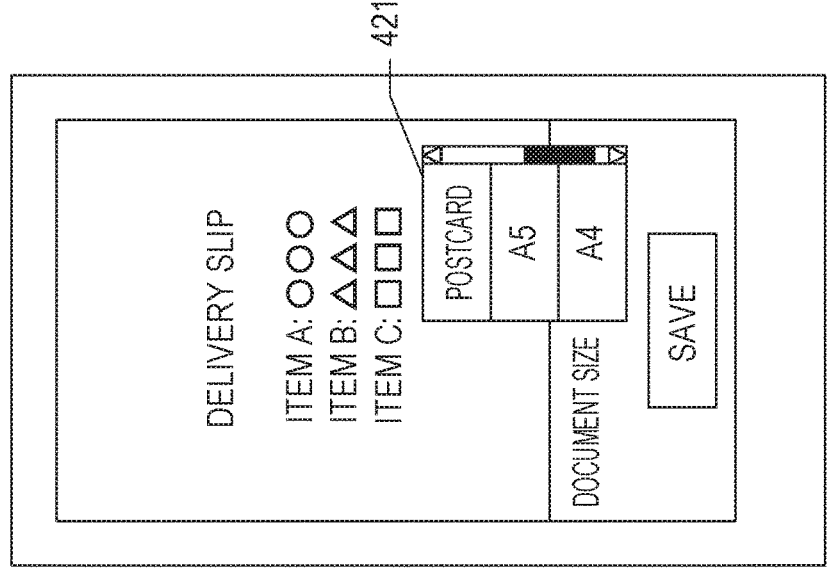
FIGS. 4A to 4C are diagrams illustrating examples of the operation screen.

In step S206, the image editing unit 1304 corrects the distortion of the image data (performs perspective transformation) so that the quadrilateral becomes a rectangle on the basis of the positions of the determined four sides, crops the document portion, and stores the document portion in the RAM 104 as rectangular image data. The image data stored in the RAM 104 is presented to the user via the screen of the operating unit 107. FIG. 4A illustrates the screen of the operating unit 107 after the distortion is corrected. Reference sign 401 denotes the image data on the document portion obtained as a result of the distortion correction.

In step S207, the document-paper-size determination unit 1305 determines the document size by comparing the paper size table stored in the HDD 105 with the width and the height of the quadrilateral calculated in step S203. An example of the paper size table is illustrated in FIG. 5. Reference sign 501 denotes a column showing paper sizes, listing standard paper sizes, "postcard", "envelope", ", "A4", "A3", "B5", and "B6". The paper sizes shown here are given for illustrative purpose only. Other paper sizes, such as a user-defined paper size, may be defined. Reference sign 502 denotes a column showing the widths of the paper sizes, expressed in mm (millimeters). Reference sign 503 denotes a column showing the heights of the paper sizes, expressed in mm (millimeters). The document-paper-size determination unit 1305 determines, as the document size, the one having the smallest mean square error between the calculated width and height of the quadrilateral and each paper size in the paper size table. For example, if the calculated width of the quadrilateral is 220 mm, and the height is 305 mm, the mean square errors from the paper sizes in the paper size table are 39,049 (postcard), 14,900 (envelope), 164 (A4), 19,154 (A3), 32,773 (B6), and 16,498 (B5). Accordingly, when the width of the detected quadrilateral is 220 mm, and the height is 305 mm, the document size is determined to be A4 whose mean square error is smallest. Although the mean square error is used to determine the document size, the one whose difference between the area of the detected quadrilateral and the area of each paper size in the paper size table is smallest may be determined to be the document size.

Figure 4B:
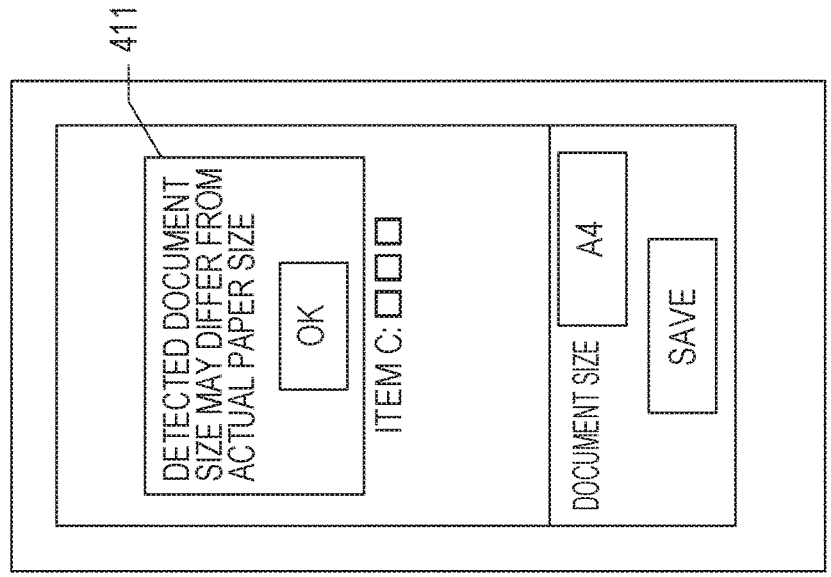

In step S208, the control unit 1301 determines whether the accuracy of the document size determined in step S207 is equal to or higher than a predetermined standard. Here, the closer to zero the mean square error, the higher the accuracy of the document size, and the larger the mean square error, the lower the accuracy of the document size. For example, when the predetermined standard is 5,000, and all of the mean square errors for the paper sizes are larger than the standard 5,000, the control unit 1301 determines that the accuracy is low. If it is determined that the accuracy is low, the process goes to step S209; otherwise, the process goes to S210. In step S209, the control unit 1301 notifies the user that the determined document size may differ from an actual paper size. An example of the notification is illustrated in FIG. 4B. A notification 411 is a pop-up view indicating that the determined document size may differ from the actual paper size, in which the user can proceed to the next processing by pressing the OK button. In step S210, the control unit 1301 displays the determined document size on the screen of the operating unit 107. Reference sign 402 in FIG. 4A is a display example of the determined document size.

Figure 4C:
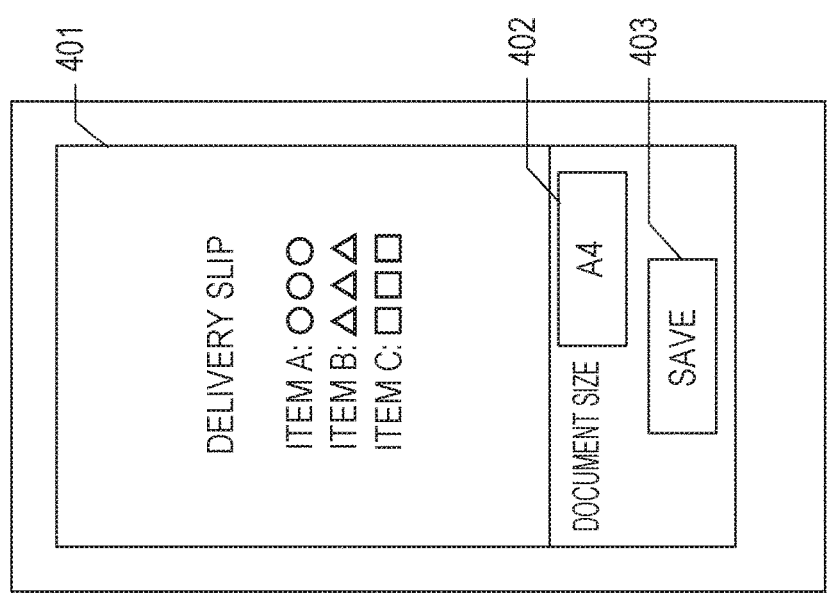

If the determined document size is incorrect, the document size can be changed according to an instruction from the user. In step S211, the control unit 1301 determines whether an instruction to change the document size has been given from the user. When the control unit 1301 detects a tap of the user on the document size 402 displayed on the screen of the operating unit 107, the process goes to step S212 and displays the paper sizes in the paper size table as change candidates, as in a document-size selection area denoted by 421 in FIG. 4C. The document-size selection area 421 can be scrolled, so that the user can select a desired document size. The control unit 1301 stores, as the document size, the paper size selected by the user in the document-size selection area 421 in the RAM 104.

In step S213, the control unit 1301 determines whether a save button 403 has been pressed by the user. If it is determined that the save button 403 has been pressed, the process goes to S214; otherwise, the process goes to S211.

In step S214, the document size displayed on the document size 402 when the save button 403 is pressed by the user is set as the document size of the image data and is stored in the HDD 105. If the aspect ratio of the image data 401 whose distortion is corrected in step S206 differs from the aspect ratio of the displayed document size 402, the image data may be shaped by being scaled up or down in at least one of the vertical direction or the horizontal direction so that the aspect ratios match and may be thereafter stored. In other words, if in step S211 an instruction to change the document size has not been given from the user, the image data is shaped to the document size that is automatically determined in step S207, and the document size is set and stored. If in step S211 an instruction to change the document size has been given from the user, the image data is shaped to have the document size specified in step S212, and the document size is set and stored. A method for shaping the image data is not limited to the scaling up or down of the image data. A method of adding a margin to the top or bottom or the right or left to make the aspect ratio of the image data match the specified aspect ratio 402 can also be adopted.

Thus, the information processing apparatus (the mobile terminal) of the present embodiment determines the closest document size from registered document sizes on the basis of a document size calculated from the captured image data and presents the document size. This allows presenting an accurate document size. This also allows the user to correct the distortion of the image data on the photographed document and to set the document size by a simple operation.

Second Embodiment

In a second embodiment, if the accuracy of the determined document size is lower than a predetermined standard, a document size with the highest accuracy and a document size with the second accuracy are presented to the user as candidates of the document size to prompt the user to select a document size. This makes it easy for the user to select a size closest to a desired paper size according to the intended or predetermined use even if a document that does not match paper sizes defined in the paper size table is captured. The difference from the flowchart in FIG. 2 described in the first embodiment will be described with reference to the flowchart of FIG. 6.

Figure 6:
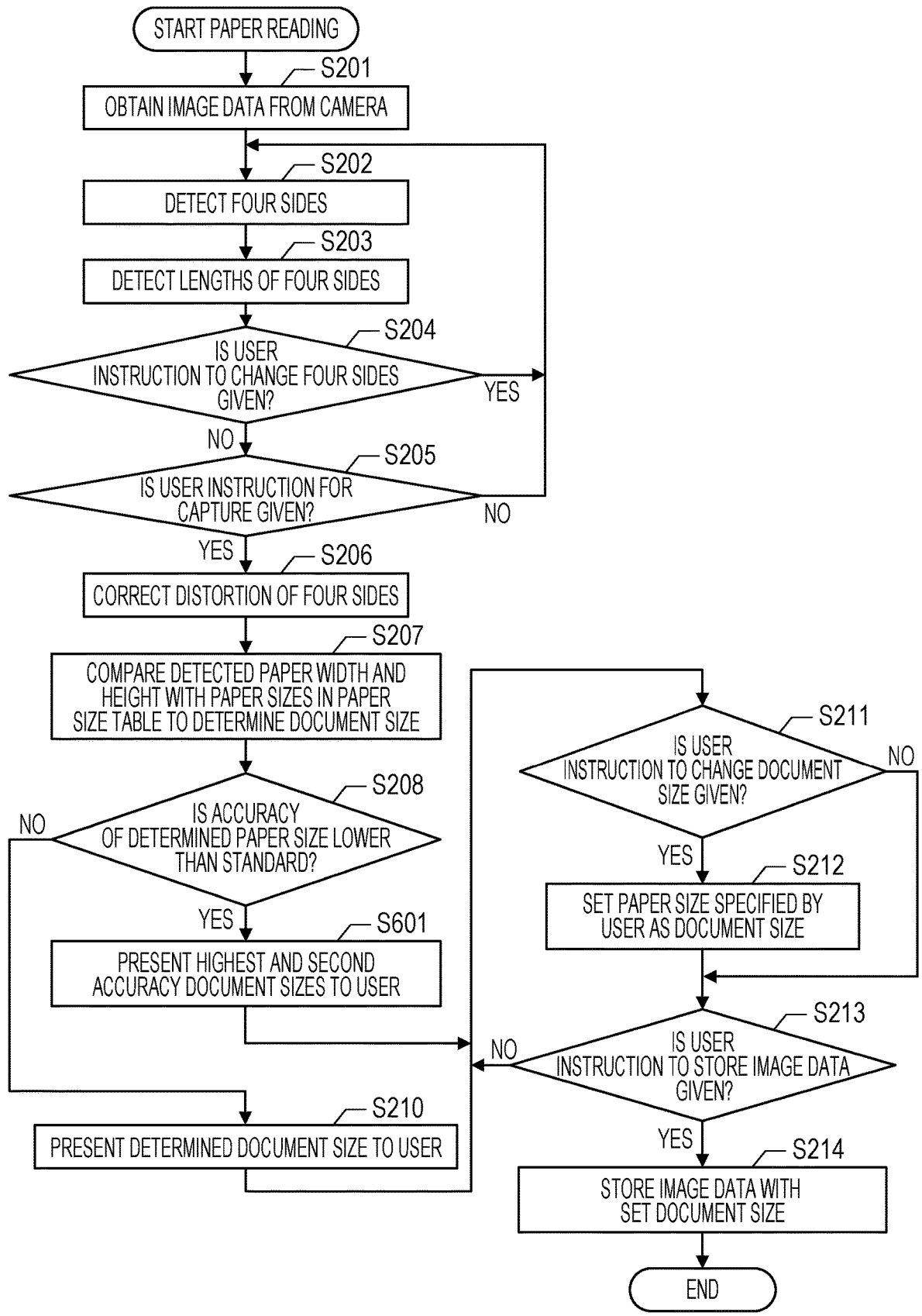
FIG. 6 is a flowchart for document-size determination processing of a second embodiment.
Figure 7:
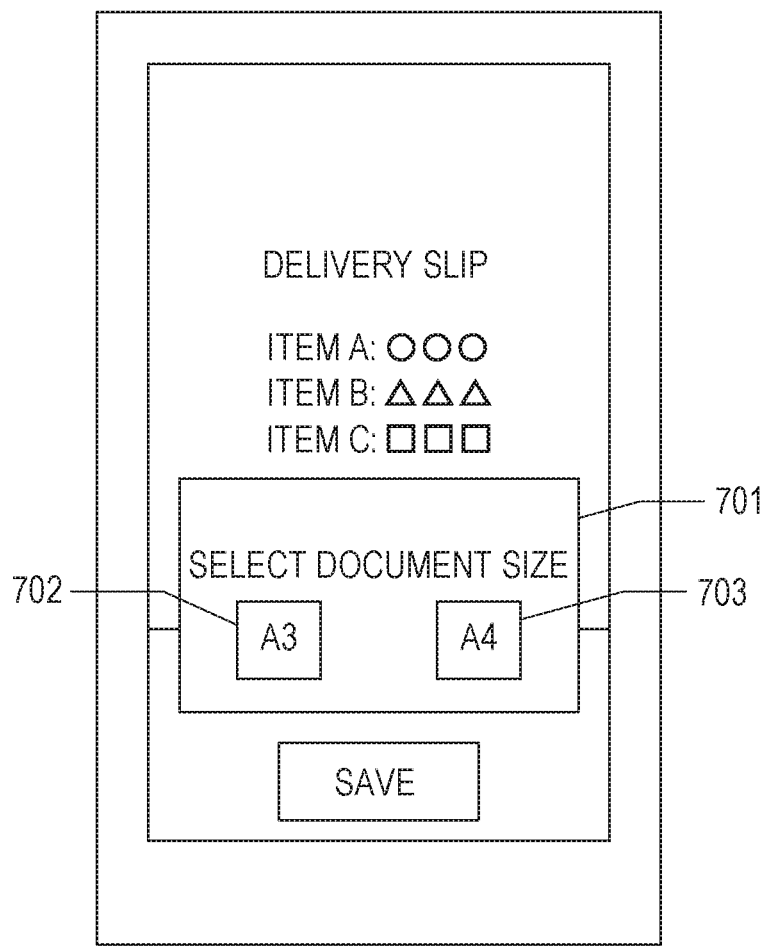
FIG. 7 is a diagram illustrating a document-size setting screen of the second embodiment.

The processes of steps S201 to S207 in FIG. 6 are the same as those of FIG. 2. If the accuracy of the document size determined in step S208 is lower than a predetermined standard, the process goes to S601, in which the control unit 1301 displays a document size with the highest accuracy and a document size with the second accuracy on the screen of the operating unit 107 to prompt the user to select a document size. For example, if the width of the quadrilateral calculated in step S203 is 270 mm, and the height is 350 mm, the mean square errors between the calculated size and the sizes stored in the paper size table of FIG. 5 are as follows: postcard: 69,704, envelope: 35,725, A4: 6,409, A3: 5,629, B6: 57,028, and B5: 28,393. Assuming that the predetermined standard is 5,000, a selection screen for A4 and A3 is displayed on the screen of the operating unit 107 for the user because the mean square errors of A4 and A3 are 6,409 and 5,629, respectively. FIG. 7 illustrates a pop-up view (a selection screen) 701 for prompting the user to select a document size. Reference sign 702 denotes a button indicating the highest accuracy A3 size, and reference sign 703 denotes a button indicating the second accuracy A4 size. The user can easily set the document size by pressing a desired button.

In the present embodiment, two options are presented to the user in descending order of accuracy. However, the number of options is not limited to two. All of document sizes having accuracy higher than a second standard may be presented. For example, when the mean square errors of all the document sizes are greater than the predetermined standard 5,000 (the accuracy of the document sizes is low), all of document sizes having mean square errors less than a second standard 10,000 may be presented as options.

Third Embodiment

In a third embodiment, if the accuracy of the determined document size is lower than a predetermined standard, the highest accuracy document size and a button for setting a new user-defined size on the bases of the width and the height of the calculated document size are presented to the user to prompt the user to select a desired document size. This makes it easy for the user to select whether to set a defined paper size according to the intended or predetermined use or to set a newly defined paper size as the document size even if a document that does not match paper sizes defined in the paper size table is captured. The difference from the flowchart in FIG. 2 described in the first embodiment will be described hereinbelow with reference to the flowchart of FIG. 8.

Figure 8:
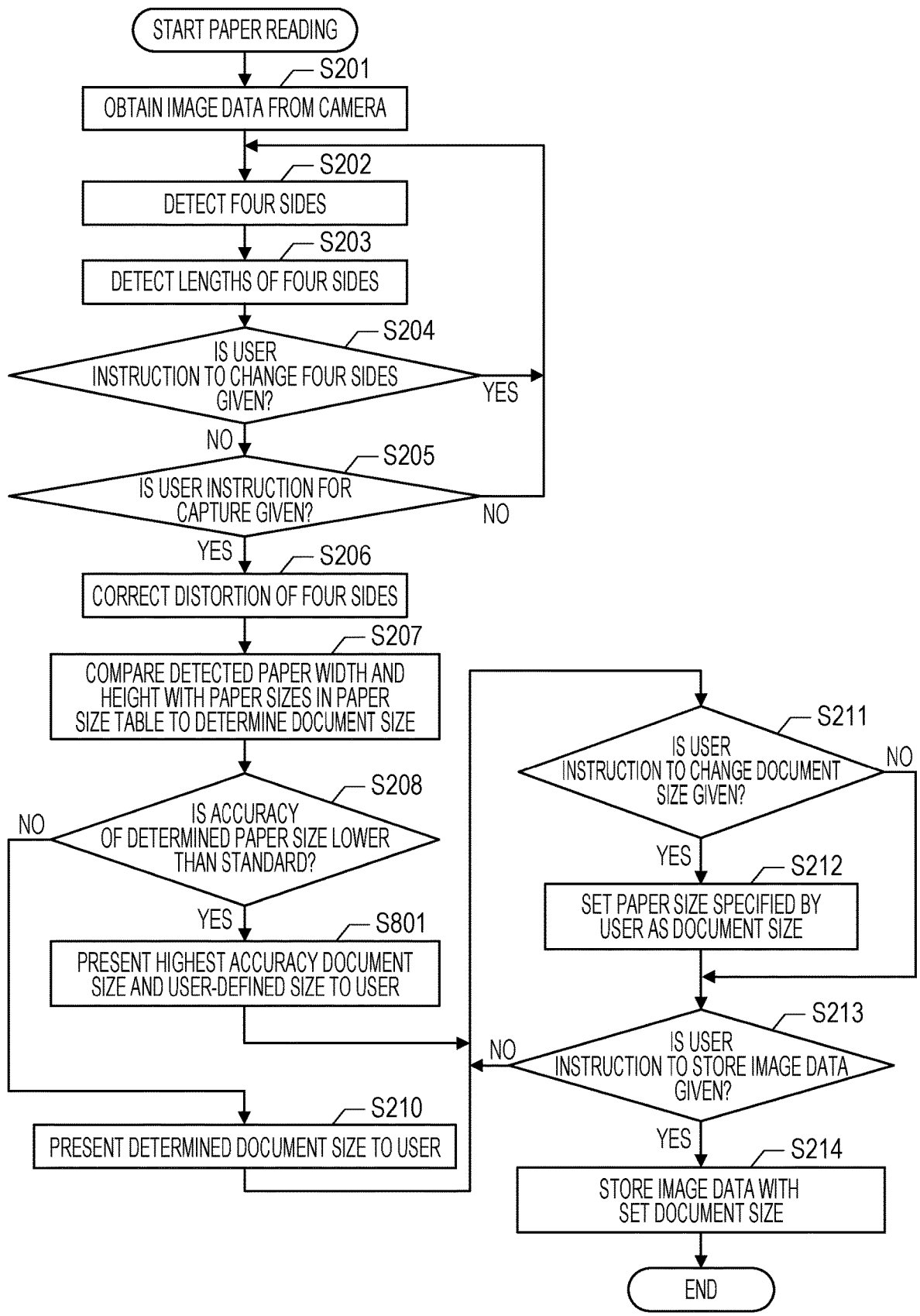
FIG. 8 is a flowchart for document-size determination processing of a third embodiment.
Figure 9:
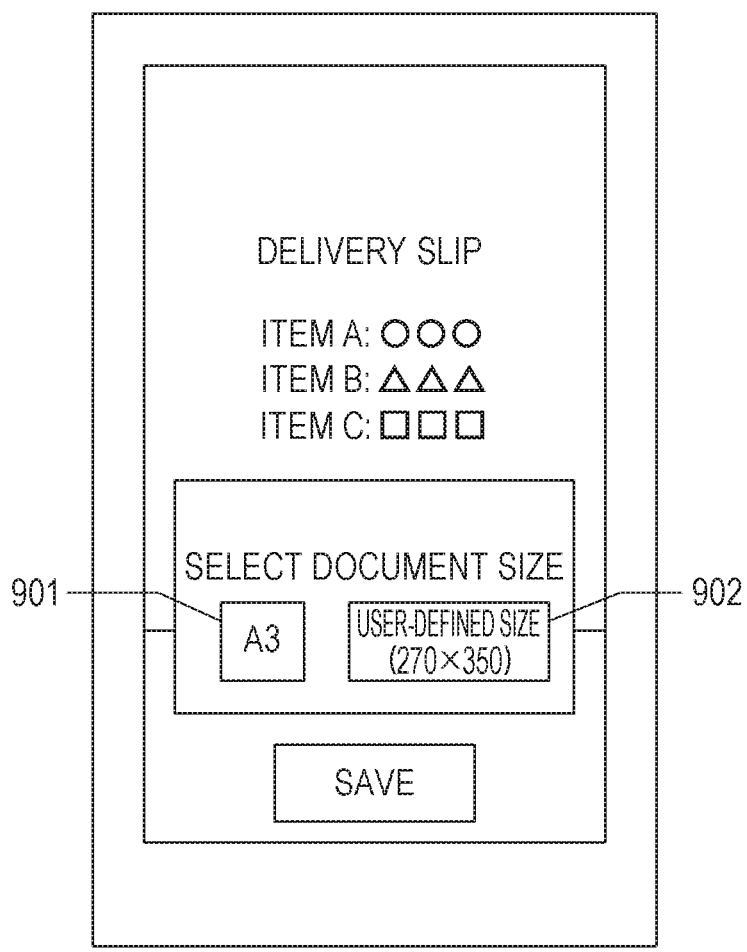
FIG. 9 is a diagram illustrating a document-size setting screen of the third embodiment.

The processes of steps S201 to S207 in FIG. 8 are the same as those of FIG. 2. If the accuracy of the document size determined in step S208 is lower than a predetermined standard, the process goes to S801. In step S801, the control unit 1301 displays a button indicating a document size with the highest accuracy and a button for specifying the width and the height of the document size calculated in step S203 as a new user-defined size on the screen of the operating unit 107 to prompt the user to select a document size. For example, if the width of the quadrilateral calculated in step S203 is 270 mm, and the height is 350 mm, the mean square errors between the calculated size and the paper sizes stored in the paper size table of FIG. 5 are as follows: postcard: 69,704, envelope: 35,725, A4: 6,409, A3: 5,629, B6: 57,028, and B5: 28,393. In this case, the accuracy of all the document sizes is lower than the predetermined standard (for example, 5,000). Therefore, a selection screen is displayed in a pop-up view which includes a button 901 for specifying a document size with the highest accuracy (that is, A size with the smallest mean square error of 5,629) and a button 902 for specifying the calculated document size (270×350) as a user-defined size, as in FIG. 9.

In the present embodiment, a defined document size with the highest accuracy and a new user-defined size are presented to the user as options in step S801. However, the number of defined document sizes to be presented is not limited to one but may be two or more.

Fourth Embodiment

Figure 10:
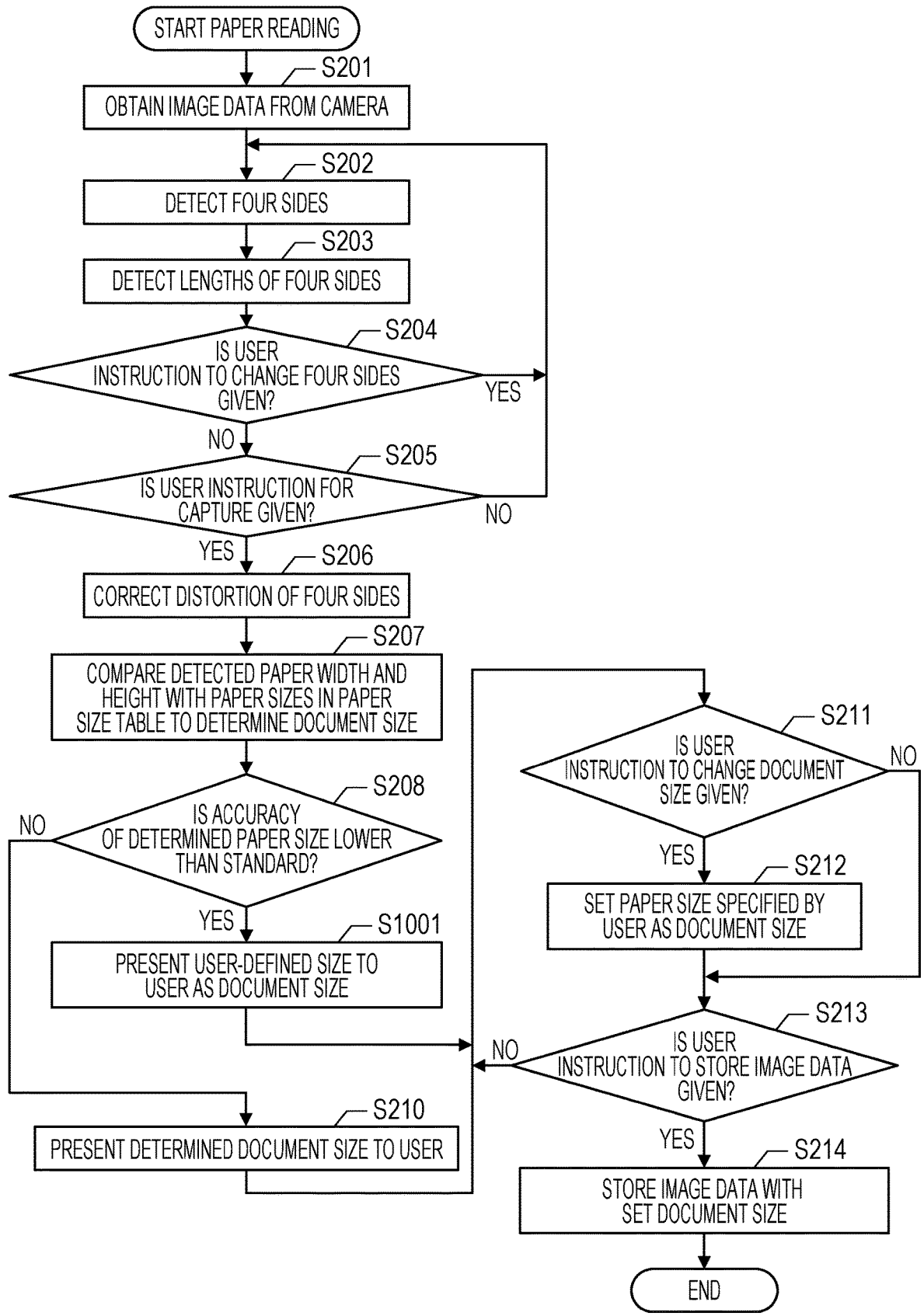
FIG. 10 is a flowchart for document-size determination processing of a fourth embodiment.
Figure 11:
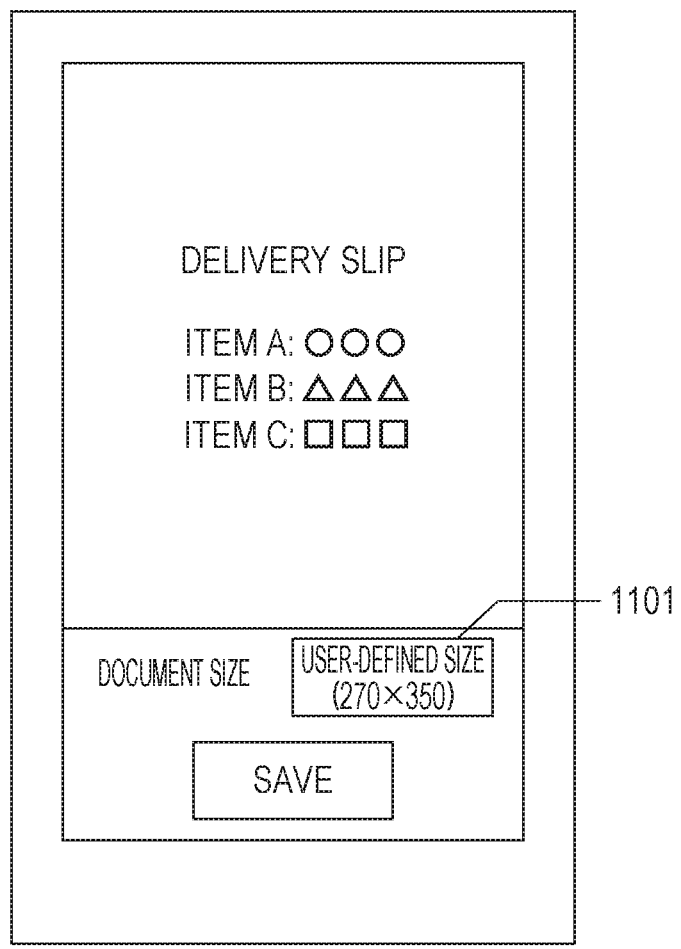
FIG. 11 is a diagram illustrating a document-size setting screen of the fourth embodiment.

In a fourth embodiment, if the accuracy of the determined document size is lower than a predetermined standard, a new user-defined size based on the width and the height of the calculated document size is defined, and a screen as in FIG. 11 in which the new user-defined size is set is presented to the user. The difference from the flowchart in FIG. 2 described in the first embodiment will be described hereinbelow with reference to the flowchart of FIG. 10.

The processes of steps S201 to S207 in FIG. 10 are the same as those of FIG. 2. If the accuracy of the document size determined in step S208 is lower than a predetermined standard, the process goes to S1001. In S1001, the control unit 1301 defines the width and the height of the document size calculated in step S203 as a new user-defined size and displays the defined user-defined size on the screen of the operating unit 107. For example, if the width of the quadrilateral calculated in step S203 is 270 mm, and the height is 350 mm, the mean square errors between the calculated size and the paper sizes stored in the paper size table of FIG. 5 are as follows: postcard: 69,704, envelope: 35,725, A4: 6,409, A3: 5,629, B6: 57,028, and B5: 28,393. In this case, the accuracy of all the document sizes is lower than the predetermined standard (for example, 5,000). Therefore, the screen of the operating unit 107 presents a screen in which the calculated document size (270×350) is selected as a new user-defined size to the user, as in FIG. 11. Reference sign 1101 indicates that the document size of the image data currently selected is a user-defined size (270×350). When the save button is selected in this state, the document size displayed on the screen in FIG. 11 is registered as the document size of the image data. If the save button is not selected, and an instruction to change the document size is given by the user, another document size different from the calculated document size (270×350) may be specified by the user.

Fifth Embodiment

In a fifth embodiment, the amount of image data to be stored can be reduced to a suitable amount by converting the resolution of the image data to be stored to a resolution suited to the intended or predetermined use of the image data. The difference from the flowchart in FIG. 2 described in the first embodiment will be described hereinbelow with reference to the flowchart of FIG. 12.

Figure 12:
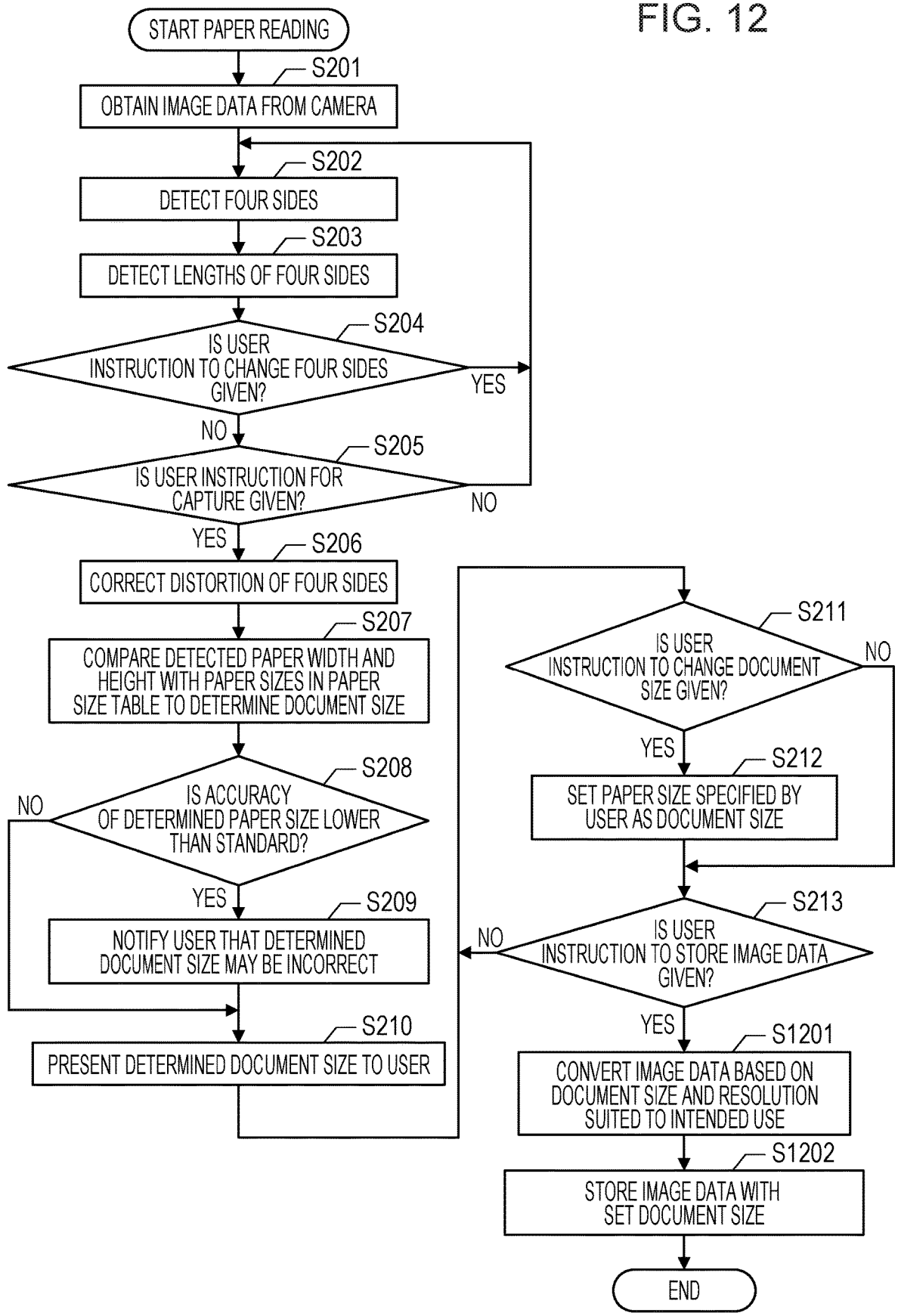
FIG. 12 is a flowchart for document-size determination processing of a fifth embodiment.

The processes of steps S201 to S213 in FIG. 12 are the same as those of FIG. 2. If in step S213 it is determined that the save button has been pressed by the user, the process goes to step S1201. In step S1201, the control unit 1301 converts the pixel size of the image data on the basis of the document size displayed in 402 of FIG. 4A and the resolution specified by the user suited to the intended or predetermined use. For example, when the intended use is printing, the resolution of the image data is converted according to the printing processing capacity of the image processing apparatus. Accordingly, when the document size set in 402 is A4, and the printing resolution is 300 dpi, the pixel size of the image data is converted to 2,480×3,508. Thus, if the pixel size of the image data whose distortion is corrected in step S206 is larger than 2,480×3,508, the data size is reduced by, for example, a bilinear method. This allows maintaining the printing quality while suppressing the data size. If the intended use is only viewing, the resolution of the image data is converted to a resolution (for example, 150 dpi) matching the resolution of the display. If the intended use is character recognition processing, the resolution is converted to a resolution (for example, 200 dpi) so that the recognition accuracy is sufficiently increased.

In step S1202, the control unit 1301 sets the document size displayed in 402 of FIG. 4A as the document size of the image data converted in step S1201.

Thus, the fifth embodiment allows storing image data with a resolution suited to the intended or predetermined use while reducing the data amount.

Sixth Embodiment

In the first embodiment, after distortion correction is performed in step S206, the document size is determined in step S207. This is given for illustrative purpose only. The order of step S206 and step S207 may be transposed. In this case, first, the document size is determined by comparing the paper size table with the width and the height of the quadrilateral calculated in step S203. Next, the distortion of the image data is corrected so that the quadrilateral becomes rectangular. The document portion whose distortion is corrected is cropped to generate rectangular image data. The image data is shaped so that its aspect ratio matches the aspect ratio of the determined document size and is thereafter displayed on the screen of FIG. 4A.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-113206, filed Jun. 18, 2019, which is hereby incorporated by reference herein in its entirety.

What is claimed is:

1. An information processing apparatus comprising:
a memory to store instructions; and
a processor to execute the instructions to perform operations including:
detecting sides of a document included in captured image data that is captured by a camera,
calculating lengths of the detected sides of the document based on information obtained from at least one sensor that is different from the camera,
determining, from among a plurality of predefined paper sizes, one paper size corresponding to the document based on the calculated lengths of the sides,
displaying, on a screen, both of the calculated lengths and the one paper size determined to correspond to the document,
setting the determined one paper size as a document size of the document included in the captured image data if the one paper size is selected on the screen by a user, and
setting the calculated lengths as the document size of the document if the calculated lengths are selected on the screen by the user.

2. The information processing apparatus according to claim 1, wherein the calculated lengths of the detected sides of the document are a width and a height of the document.

3. The information processing apparatus according to claim 1,
wherein, in executing the instructions, the processor further performs operations including distortion correction processing and cropping processing on the captured image data based on the detected sides to obtain distortion-corrected image data of the document, and
wherein the setting of the determined one paper size includes setting the determined one paper size as a document size of the distortion-corrected image data of the document.

4. The information processing apparatus according to claim 3, wherein the distortion-corrected image data is obtained by performing, on the captured image data, the distortion correction processing and the cropping processing so that an aspect ratio of the captured image data matches an aspect ratio of the set document size.

5. The information processing apparatus according to claim 1, wherein, in executing the instructions, if accuracy of the determined one paper size is lower than a predetermined standard, the processor further performs operations including notifying the user that the determined one paper size may be incorrect.

6. An information processing apparatus comprising:
a memory to store instructions; and
a processor to execute the instructions to perform operations including:
detecting four sides of a document included in captured image data that is captured by a camera,
calculating lengths of the detected four sides of the document based on information obtained from at least one sensor that is different from the camera,
determining, from among a plurality of predefined paper sizes, one paper size corresponding to the document based on the calculated lengths of the four sides, and
setting the determined one paper size as a document size of the document included in the captured image data,
wherein if accuracy of the determined one paper size is lower than a predetermined standard, the processor further performs operations including presenting, in a descending order of accuracy, a plurality of paper sizes as options, and
wherein, if the accuracy of the determined one paper size is lower than the predetermined standard, a paper size selected from the presented plurality of paper sizes as options by a user is set as the document size of the document.

7. An information processing apparatus comprising:
a memory to store instructions; and
a processor to execute the instructions to perform operations including:
detecting four sides of a document included in captured image data that is captured by a camera,
calculating lengths of the detected four sides of the document based on information obtained from at least one sensor that is different from the camera,
determining, from among a plurality of predefined paper sizes, one paper size corresponding to the document based on the calculated lengths of the four sides, and
setting the determined one paper size as a document size of the document included in the captured image data,
wherein if accuracy of the determined one paper size is lower than a predetermined standard, the processor further performs operations including displaying a width and a height of the document calculated in the calculating of the lengths, and
wherein, if the accuracy of the determined one paper size is lower than the predetermined standard and a storing instruction with the displayed width and height is received from a user, the displayed width and height are set as the document size of the document.

8. The information processing apparatus according to claim 1,
wherein, in executing the instructions, the processor further performs operations including:
distortion correction processing on the captured image data based on the detected sides to obtain distortion-corrected image data, and
converting a pixel size of the distortion-corrected image data based on the set document size and a resolution suited to an intended use of the captured image data, and
wherein the set document size is set to the distortion-corrected image data whose pixel size is converted.

9. A method for an information processing apparatus, the method comprising:
- detecting sides of a document included in captured image data that is captured by a camera;
- calculating lengths of the detected sides of the document based on information obtained from at least one sensor that is different from the camera;
- determining, from among a plurality of predefined paper sizes, one paper size corresponding to the document based on the calculated lengths of the sides;
- displaying, on a screen, both of the calculated lengths and the one paper size determined to correspond to the document;
- setting the determined one paper size as a document size of the document included in the captured image data if the one paper size is selected on the screen by a user; and
- setting the calculated lengths as the document size of the document if the calculated lengths are selected on the screen by the user.

10. A non-transitory computer-readable storage medium storing a program to cause a computer to perform a method for an information processing apparatus, the method comprising:
- detecting sides of a document included in captured image data that is captured by a camera;
- calculating lengths of the detected sides of the document based on information obtained from at least one sensor that is different from the camera;
- determining, from among a plurality of predefined paper sizes, one paper size corresponding to the document based on the calculated lengths of the sides;
- displaying, on a screen, both of the calculated lengths and the one paper size determined to correspond to the document;
- setting the determined one paper size as a document size of the document included in the captured image data if the one paper size is selected on the screen by a user; and
- setting the calculated lengths as the document size of the document if the calculated lengths are selected on the screen by the user.

11. An information processing apparatus comprising:
a memory to store instructions; and
a processor to execute the instructions to perform operations including:
- detecting sides of a document included in captured image data that is captured by a camera,
- obtaining, from a module of an operating system of the information processing apparatus, lengths of the detected sides of the document, wherein the lengths are calculated by the module of the operating system,
- determining, from among a plurality of predefined paper sizes, one paper size corresponding to the document based on the calculated lengths of the sides,
- displaying, on a screen, both of the calculated lengths and the one paper size determined to correspond to the document,
- setting the determined one paper size as a document size of the document included in the captured image data if the one paper size is selected on the screen by a user, and
- setting the calculated lengths as the document size of the document if the calculated lengths are selected on the screen by the user.

* * * * *